(12) United States Patent
Wedgeworth, III

(10) Patent No.: US 9,910,905 B2
(45) Date of Patent: Mar. 6, 2018

(54) SYSTEM AND METHOD FOR ASSESSING DATA ACCURACY

(71) Applicant: Early Warning Services, LLC, Scottsdale, AZ (US)

(72) Inventor: Frederick L. Wedgeworth, III, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 394 days.

(21) Appl. No.: 14/734,992

(22) Filed: Jun. 9, 2015

(65) Prior Publication Data

US 2016/0364427 A1   Dec. 15, 2016

(51) Int. Cl.
G06F 17/30 (2006.01)

(52) U.S. Cl.
CPC .. G06F 17/30575 (2013.01); G06F 17/30303 (2013.01)

(58) Field of Classification Search
CPC ................ G06F 17/30575; G06F 17/30303
See application file for complete search history.

(56) References Cited

U.S. PATENT DOCUMENTS

| | | | | |
|---|---|---|---|---|
| 8,682,764 B2* | 3/2014 | Love | ............. | G06Q 10/10 705/35 |
| 8,983,914 B2* | 3/2015 | Kung | ............. | G06Q 10/10 707/687 |
| 9,578,043 B2* | 2/2017 | Mawji | ............. | H04L 63/1408 |
| 9,594,790 B2* | 3/2017 | Fuchs | ............. | G06F 17/30345 |
| 2006/0212931 A1* | 9/2006 | Shull | ............. | G06F 21/55 726/10 |
| 2006/0294151 A1* | 12/2006 | Wong | ............. | G06F 17/30557 |
| 2009/0182780 A1* | 7/2009 | Wong | ............. | G06F 17/30557 |
| 2010/0198503 A1* | 8/2010 | Beckner | ............. | G06F 17/30241 701/408 |
| 2012/0226590 A1* | 9/2012 | Love | ............. | G06Q 10/10 705/30 |
| 2013/0080197 A1* | 3/2013 | Kung | ............. | G06Q 10/10 705/7.11 |
| 2013/0282699 A1* | 10/2013 | Feng | ............. | G06F 17/3053 707/722 |
| 2014/0222631 A1* | 8/2014 | Love | ............. | G06Q 10/10 705/30 |
| 2014/0289187 A1* | 9/2014 | Fuchs | ............. | G06F 17/30345 707/609 |
| 2015/0127660 A1* | 5/2015 | Zilberberg | ............. | G06F 17/3053 707/748 |

(Continued)

*Primary Examiner* — Jean M Corrielus
(74) *Attorney, Agent, or Firm* — Kilpatrick Townsend & Stockton LLP

(57) ABSTRACT

Data from a plurality of data sources is provided to a multi-source data management system, which stores the data and provides it to a data accuracy system for purposes of assessing the accuracy of data records and the individual fields within data records. Data accuracy scores may be stored at the data management system with the data records to which they pertain. Accuracy scores may be periodically recalculated and monitored, and alerts provided if an accuracy score changes a predetermined amount over a given period of time. Also, data records may be provided by a data user for accuracy assessment, using other data records stored at the multi-sourced data management system.

26 Claims, 7 Drawing Sheets

(56) References Cited

U.S. PATENT DOCUMENTS

2016/0179806 A1\* 6/2016 Mortensen ............. G06K 9/627
                                                    382/115
2016/0277424 A1\* 9/2016 Mawji ................. H04L 63/1408
2017/0237755 A1\* 8/2017 Visbal ................ H04L 63/1416
2017/0301038 A1\* 10/2017 Mawji .................... G06Q 50/01

\* cited by examiner

SYSTEM AND METHOD FOR ASSESSING DATA ACCURACY

BACKGROUND OF THE INVENTION

Access to accurate data is important to most businesses. As an example, financial institutions, such as banks, may rely on large amounts of data to conduct their business. Data can be used to verify the identity of a person opening an account, to identify fraud and other risks associated with financial transactions conducted against accounts, and to provide access to needed information, such as personal and contact information, for customers. The more accurate the data, the better a financial institution is able to perform its day-to-day business functions.

Financial institutions often have access, directly or indirectly, to many sources of data that may be usable for business functions. For example, a bank seeking to assess the risk associated with a transaction (such as a deposited check) may access a number of different data sources to confirm identity and other information provided with the transaction.

Data maintained by different sources may have varying degrees of accuracy, sometimes depending on how the data is collected and maintained. For example, data accuracy may suffer as a result a person introducing typographical errors when the data is entered. In some cases, data that is accurate at one point in time may become less inaccurate over time, such as when a person's name or address changes and the latest information is not updated at the data source. Further, some data sources solicit information from many people without emphasis on the data being accurate (such as at social networking site), and so the data associated with a given person at the data source may be accurate for some collected data but not as to other collected data.

As yet another example of data inaccuracy, perhaps involving a more serious risk, information maintained at a data source may be inaccurate because it is been provided by third party for a fraudulent purpose. Specifically, a person conducting a transaction or opening an account may provide false information to a bank in order to use the transaction or account for improper purposes.

Financial institutions often access multiple data sources (e.g., data other than that collected at the institution itself) to reduce risk, since, among other things, the greater the number of independent sources that have information consistent with data being provided by a person, the more likely it is that the provided data can be trusted. As just one example, if a customer provides several pieces of personal information (such as a name, address, date of birth and social security number) in order to establish the customer's identity when conducting business, and if several different data sources each confirm that all of the pieces of personal information are, in fact, associated with just one person, there is a higher likelihood that the provided data is trustworthy.

As a result, it can be advantageous to access as many data sources as possible when it is important to confirm or verify data. Unfortunately, since the trustworthiness of data may vary from data source to data source, using multiple sources of data (where some sources are trustworthy and others are less trustworthy) may lead to a less reliable risk determination. As a result, data sources that have some degree of perceived untrustworthiness may not be used at all for determining risk, even though there may be some useful information at those data sources.

BRIEF SUMMARY OF THE INVENTION

There is provided, in accordance with embodiments of the present invention, a system and method for assessing the accuracy of data records using data from a plurality of data sources, including data sources that are both trusted and untrusted (or sources with varying degrees of trustworthiness).

In one embodiment, a method for evaluating data record accuracy includes storing, at a data storage system, a plurality of data records received from a plurality of different data sources, wherein the data records have varying degrees of trustworthiness, and wherein each of the stored data record are associated with an entity; receiving a data record based on a specified entity, the received data record to be evaluated for accuracy, and retrieving a group of data records from the stored plurality for data records, each retrieved data record associated with the specified entity, each retrieved data record having a data field corresponding to a data field of the data record to be evaluated, and each retrieved data record associated with one of the data sources. The method further includes calculating, at a data accuracy system, an accuracy score for the data field of the data record to be evaluated. The accuracy score is calculated by: determining a trustworthiness weight for at least each one of the retrieved group of data records based on the trustworthiness of the data source providing each one of the group of data records; determining a matching score for at least the corresponding data field in each of the retrieved group of data records, based on the degree of similarity between (1) data in the corresponding data field in each of the retrieved group of data records and (2) data in the data field of the data record to be evaluated; and combining, for the corresponding data field in each one of the retrieved group of data records, (1) the trustworthiness weight for that one of the retrieved group of records, with (2) the matching score for the corresponding data field in that one of retrieved group of data records. The method then includes summing together the combined trustworthiness weight and matching score for every corresponding data field.

A more complete understanding of the present invention may be derived by referring to the detailed description of the invention and to the claims, when considered in connection with the Figures.

DETAILED DESCRIPTION OF THE INVENTION

Figure 1:
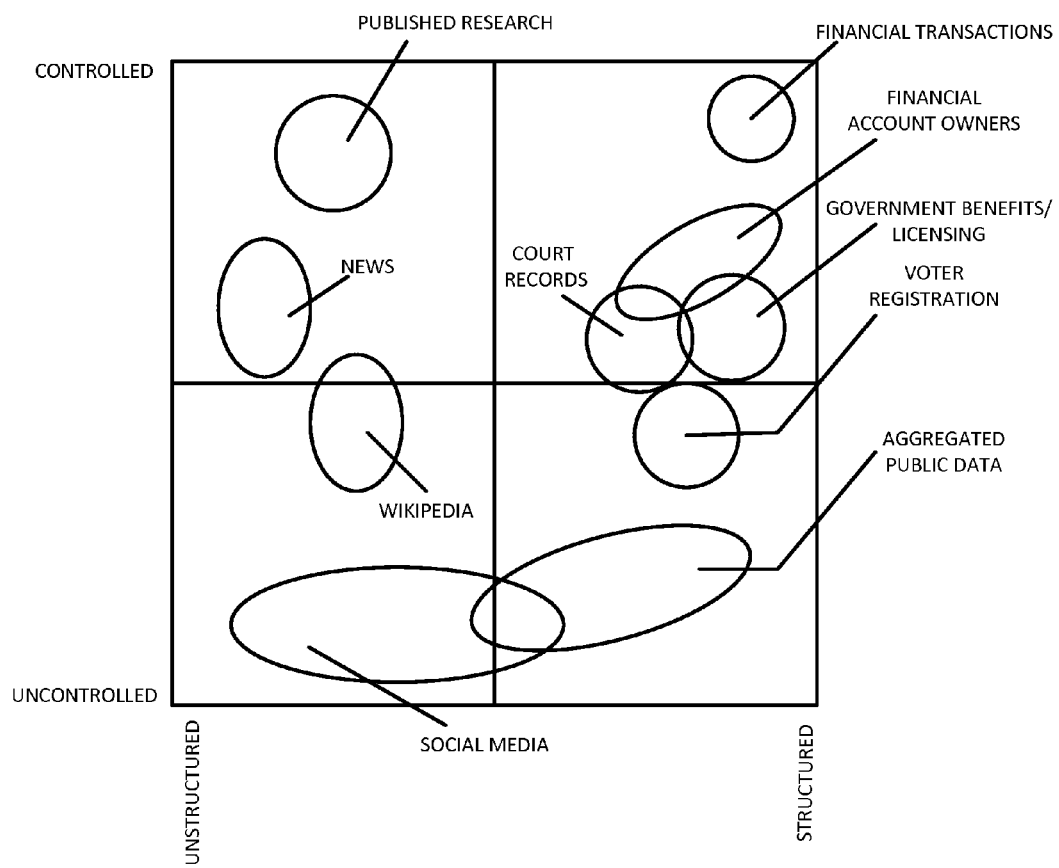
FIG. 1 is a diagram illustrating various categories of data that may be used in systems and methods of the present invention in order to assess data accuracy.

There are various embodiments and configurations for implementing the present invention. Generally, embodiments provide systems and methods for accessing data from multiple data sources and assessing the accuracy of the data. In described embodiments, data from the multiple sources is provided to and stored at a multi-source data management system. Multiple data records stored at the data management system have their individual data elements assessed, and an accuracy score is calculated for each of the data elements and is stored with the associated data record.

In some embodiments, a data accuracy system calculates accuracy scores for data and receives requests for accuracy scores from users. Further, in some embodiments, the data accuracy system monitors data accuracy scores and provides an alert when there is a predetermined change in data accuracy (e.g., a data source has a meaningful drop in the accuracy of its data).

In other described embodiments, a data accuracy system receives a data record from a user requesting an accuracy score. The data record may pertain to a specific person or entity. The data accuracy system calculates an accuracy score for the data record using other data records (e.g. for the same person or entity) stored at the multi-sourced data management system.

As will be described later, systems and methods for accessing the accuracy of data from various data sources permits the use of a large set of available data for various purposes, such as for use by a financial institution. As examples only, a bank may use the data accuracy system to determine an accuracy score for a data record built from information provided by customer, such as a customer opening a new account. If the data in the data record is found to be accurate or likely to be accurate, the bank is able to open an account with greater confidence in the trustworthiness of the data and the customer providing it. Along the same lines, a bank may use a data accuracy score to evaluate its own data and data systems. A large amount of data records of the bank may be provided (e.g., on a periodic basis) to the data accuracy system and those records may be assessed using data records from a number of other data sources. The more extensive and numerous the other data records, the more thoroughly the data records of the bank can be assessed for accuracy and the more trustworthy the accuracy score for the data records (i.e., a large number of independent sources can advantageously be used for determining whether an individual data element is accurate or not).

Embodiments of the invention may be used to provide accuracy scores at various levels of data structures. For example, in one described embodiment, an accuracy score is developed for each individual data element or field within a data record, and that score is stored with the data record (e.g., as metadata). Thus, a user querying the data accuracy system can access the system to receive scores for individual elements of a data record of interest (e.g., a bank evaluating data received from a prospective customer may, if desired, receive a score for specific data elements of a data record for the customer, such as name, social security number, and/or address). Further, a user querying the data accuracy system can receive accuracy scores for other levels of data, such as (1) the overall accuracy of a data record (e.g., combined weighted values of scores for the individual data elements of the record), (2) the overall accuracy of data records associated with a specific person or entity (e.g., combined weighted values of scores for multiple data records associated with that person or entity), (3) the overall accuracy of a data source (e.g., combined values of scores of all the data records associated with that data source), (4) the overall accuracy of the entire data corpus (body of data) of a data provider (e.g., a data provider that aggregates data from multiple data sources), or (5) the overall accuracy of the entire aggregated data corpus from many data providers. Accuracy changes can be tracked over time (e.g., for the just-referenced levels of data 2, 4 and 5. Levels of data 1 and 3 capture data at fixed points in time and thus their accuracy scores would not normally change due to time, but could change as new relevant information is obtained (e.g., new conflicting or supporting data will lower or raise a record's estimated accuracy).

The scoring of data accuracy, in accordance with described embodiments, advantageously facilitates the use of data from many different data sources. As mentioned earlier, when the number (and variety) of data sources used for assessing accuracy is increased, it is more likely that a useful and trustworthy accuracy score will be obtained. In the past, some data sources, such as social media websites and other uncontrolled data sources have not been used when accurate data has been needed, since at least some data collected at such sites comes from sources that are unknown or uncontrolled. By evaluating each element of a data record from such sources, those data elements that are found to be more accurate can be can be given more weight and used for certain purposes, such as the evaluation of accuracy of other data pertaining to the same entity. Those data elements that are less accurate can be given less weight when the data is being evaluated for an important or critical purpose. Thus, embodiments of the invention permit a more confident use of many different controlled and uncontrolled data sources for various purposes, where in the past some of those same data sources may have been ignored (even though at least some of the data maintained may have been viewed as valuable) because of concerns about the overall trustworthiness of the data source.

It should be further appreciated that embodiments of the present invention can be used in many applications and fields beyond the examples given above in connection with banks and other financial institutions. Generally, the use of data from a large number and variety of controlled and uncontrolled data sources (and accuracy assessment of that data) can be used by many different entities operating in many different environments. For example, embodiments of the invention may be used by government agencies needing to understand the accuracy of their own data, may be used by businesses that rely on data to identify customers and to provide products and services to those customers, and may be used by entities and individuals that may receive data and need to have confidence that the data is accurate before acting on it. More specific examples of various applications and fields with which embodiments of the invention may be used will be described later.

Turning now to FIG. 1, there are illustrated exemplary data sources that may be used for assessing data accuracy in embodiments of the invention. It should be noted that the data sources, such as those represented in FIG. 1, may be extensive and numerous, and are generally illustrated in a graph, with the graph indicating for each data source the degree to which the data at that data source is controlled and structured. Thus, in relation to the vertical axis in the graph, uncontrolled data sources appear generally at the bottom of the graph and highly controlled data sources appear generally at the top end of the graph. Likewise, in relation to the horizontal axis of the graph, unstructured data sources appear generally on the left side of the graph and highly structured data sources appear on the right side of the graph.

In FIG. 1, there are ten general categories of data sources illustrated:
Published Research
News
Wikipedia
Social Media
Financial Transactions
Financial Account Ownership Data
Government Benefits/Licensing Records
Court Records
Voter Registration, and
Aggregated Public Data.

The degree to which each data source illustrated in FIG. 1 is controlled or structured is seen by its placement in the graph. For example, data sources seen in the upper left quadrant of the graph (Published Research and News) may be highly controlled, since their authors typically follow established procedures regarding the verification of the data as it is collected and published. However the structure of such data may be highly variable (each data source has its own particular format and manner of reporting data). Data sources in the upper right-hand corner (Financial Transaction Data, Financial Account Ownership Data, Government Benefits/Licensing Data, and Court Records) are both highly controlled and highly structured. For example, a bank receives data from only certain parties, often verifies that data, and puts it into data records with a high degree of care and formatting so that it may be used for financial transactions that require accuracy and ready access.

Data sources in the lower left-hand corner of the graph are neither structured nor controlled. For example, Wikipedia has some degree of control over the manner in which data is provided (so some of the content is plausibly accurate and can be corrected if errors are found), but the format of the data or its structure will be highly variable. Social Media websites likewise may have some variability in the manner in which data is provided or formatted (certain files such a name and email address are structured, but other files such as user postings are much less structured). Also, because data collected at Social Media sites comes from individuals with little, if any, attempt to authenticate the data, much of the data at those websites would be viewed as uncontrolled and less trustworthy. In the lower right-hand corner, Voter Registration Data will be structured (it is collected with some specificity and in a format that can be easily used for verifying voter eligibility), but the accuracy may suffer since the data is collected from individuals who may or may not provide accurate or trustworthy information. Also in the lower right-hand corner is Aggregated Public Data, which is collected from many data sources and aggregated by an aggregator and sold to others. While the aggregator in question may reformat and restructure the data to make it readily usable to those persons/entities that have purchased the data, it is accuracy and trustworthiness may be low since the original sources of the data may not be well controlled.

It should be appreciated, of course, that the data sources illustrated in FIG. 1 are only exemplary, and that many other types of data sources may be used in embodiments of the invention.

Figure 2:
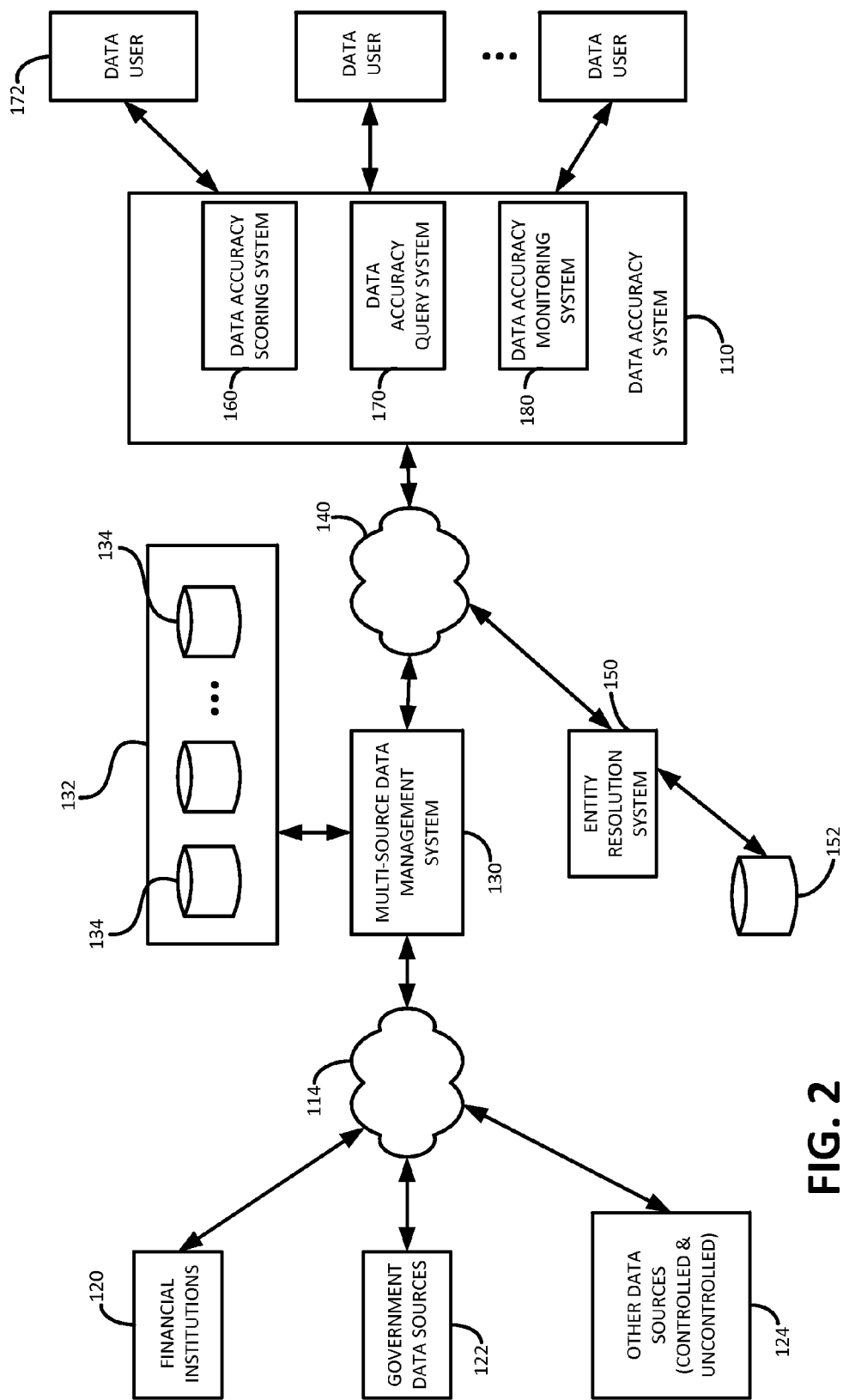
FIG. 2 is a block diagram illustrating various systems used for scoring and monitoring the accuracy of data in accordance with embodiments of the invention.

Turning to FIG. 2, there is illustrated a data accuracy system 110 that uses data provided through a network 114 from various data sources, such as financial institutions 120, government data sources 122 and other data sources 124. The data sources 120, 122 and 124 provide data having varying degrees of structure and control, and include the data sources seen in FIG. 1. The data from the data sources 120, 122 and 124 is provided to a multi-source data management system 130 which receives the data from the data sources, organizes and reformats the data for subsequent use by the data accuracy system 110, and stores the data in a data storage system 132 comprising one or more data storage devices 134. The multi-source data management system 130 is connected through a network 140 for communication with the data accuracy system 110 as well as an entity resolution system 150. The entity resolution system 150 will be described in greater detail later in conjunction with FIG. 3. However, briefly, the entity resolution system 150 organizes data from the data sources 120, 122 and 124 according to the individuals or entities to which it relates, so that the data for a single entity may be readily retrieved for purposes of accuracy scoring. The entity resolution system 150 stores data (according to the entity with which the data is associated) in an associated memory device 152 (the data may be stored itself or in the form of an index indicating where the data can be found in data storage system 132). The networks 114 and 140 are representative of various kinds of communication paths used for communications between computer-based systems, such as public networks (e.g., the Internet) or dedicated private networks.

As seen in FIG. 2, the data accuracy system 110 includes a data accuracy scoring system 160, a data accuracy query system 170 and a data accuracy monitoring system 180. The systems 160, 170 and 180 will also be described in greater detail later. However generally, the data accuracy scoring system 160 generates scores for data records (and their elements) stored at the data storage system 132. The score for each data record may be stored with the data record in the data storage system 132. The data accuracy query system 170 receives requests or queries from various data users 172 and retrieves requested accuracy scores stored from the data storage system 132 (or directly from data scoring system 160). The data accuracy monitoring system 180 monitors accuracy scores, such as pursuant to a request from one of the data users 172. As an example, the data accuracy monitoring system 180 may periodically monitor accuracy scores that are calculated by the accuracy scoring system 160, compare those scores to previous scores stored in the data storage system 132, and generate an alert to a data user 172 when an accuracy score (e.g., a newly calculated score associated with an entity, data source or a data record) exceeds a previous score by a predetermined threshold/amount.

Figure 3:
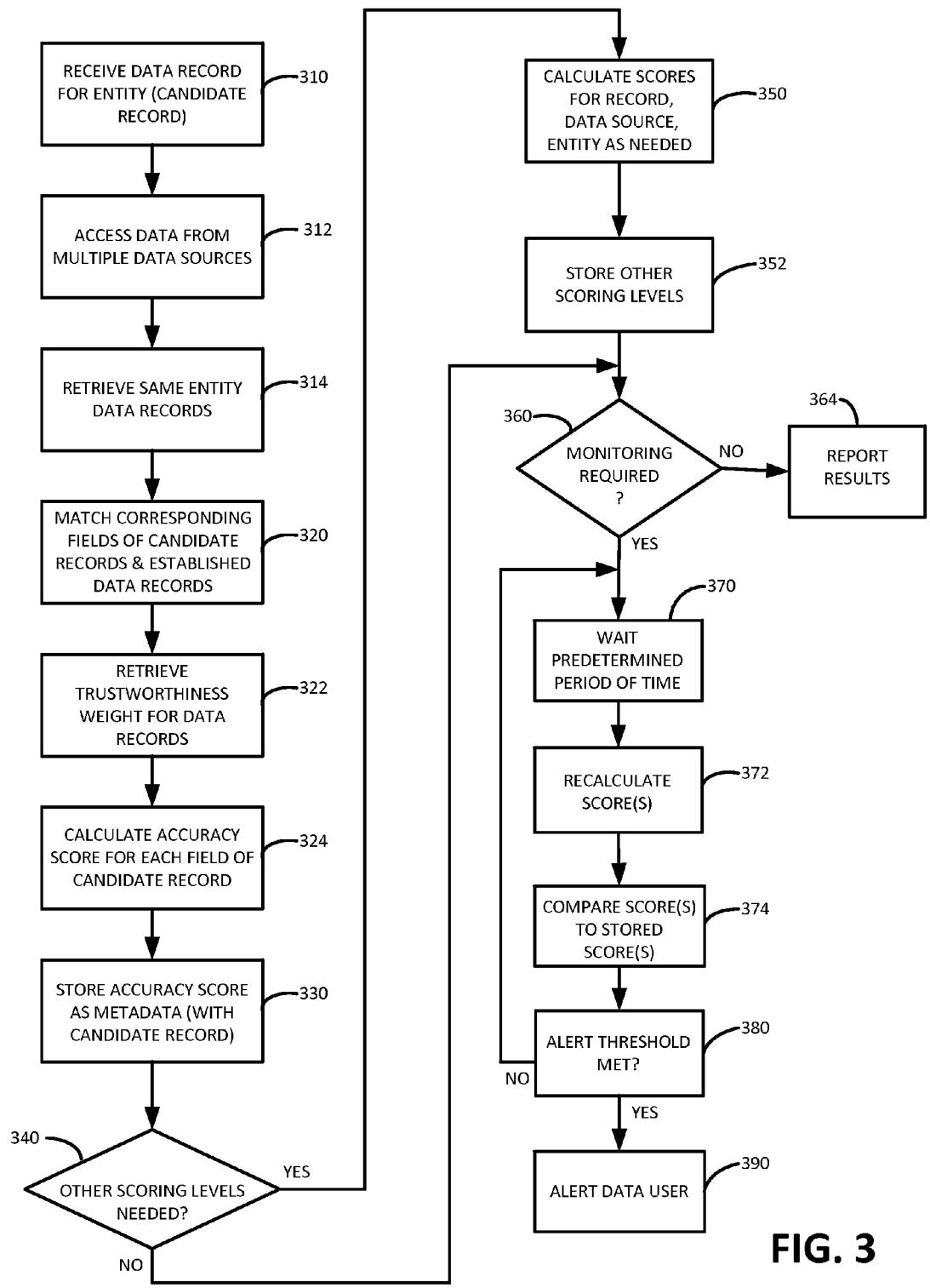
FIG. 3 is a flow diagram illustrating a process implemented within the system of FIG. 2 for scoring and monitoring the accuracy of data.

Turning now to FIG. 3, a process implemented within the data accuracy system 110 is illustrated. At step 310, the data management system 130 receives a candidate data record. The data record received at step 310 is referred to as a "candidate" record, since the illustrated process often involves the assessment of a previously un-scored individual data record. In some cases the selected candidate data record may have been provided by one of the data sources 120, 122 and 124 as part of a batch of such records previously received and stored at the data management system 130. In such cases, the data record may be one of many data records that are sequentially accessed (from data management system 130) and evaluated for accuracy. In other cases, one of the data users 172 may serve as a data source and has provided the selected data record in real time (through the data accuracy query system 170) with a request to assess the record using other data available at the data management system 130. In either case, in response to receiving a candidate data record, the data accuracy scoring system 160 accesses data records (from all available data sources at the multi-source data management system 130) that may be relevant to the accuracy assessment, step 312.

In the embodiment of FIG. 3, in order to facilitate the use of the most relevant data, the data management system 130 may retrieve all pertinent data that may pertain to the same entity as the entity of the selected candidate data record, step 314. The retrieval of same entity data records is accomplished through the entity resolution system 150.

The entity resolution system 150 may be a system similar to that described in U.S. Pat. No. 8,682,764, issued to Love at al., commonly owned with the present application and incorporated herein by reference for all purposes. Generally, the entity resolution system accesses data from the data management system 130, and then organizes that data into groups or networks of data that each represent data associated with a single person/entity. As in U.S. Pat. No. 8,682,764, the data may be organized into data node networks (each data node network having multiple data nodes/records that are all associated with a single person/entity). As described earlier, the data itself for each data node network may be stored in the memory device 152 of the entity resolution system 150. Alternatively, an index for locating the data within the data storage system 132 may be stored in the memory device 152.

Once the same entity data has been retrieved at step 314, the data accuracy scoring system 160 matches the corresponding fields of the candidate record to each of the retrieved data records for the same entity, step 320. At step 322, a trustworthiness weight for each of the data records is obtained. In one embodiment the trustworthiness weight may be pre-established by the operator of the data accuracy scoring system, based on the judgment of the operator. For example, for each of the various data sources 120, 122 and 124, the operator may assign a trustworthiness weight or score based on past experiences with the accuracy of the data as well as the subjective view of the operator as to how accurately data is maintained at those various sources. In other embodiments, a computation of the trustworthiness weight may be performed with the use of an algorithm that analyzes the various data sources in relation to each other, and establishes a trustworthiness weight based on the overall accuracy of each data source (relative to other data sources). An exemplary algorithm/process for the computation of a trustworthiness weight will be described later in conjunction with FIG. 6.

At step 324, the data accuracy scoring system 160 then calculates an accuracy score for each field of the candidate record, taking into account the trustworthiness weight of each data source having the same entity data, and a matching score that reflects the degree of similarity in the data in each field of the candidate record and in the corresponding field of the other established records retrieved for the same entity. A specific process and an example of the calculation of a data accuracy score will be described later in conjunction with FIG. 5.

At step 330, the calculated accuracy score for each field of a data record may be stored with that data record (e.g., as metadata) at the data storage system 132. In some cases, depending on the type of score that may requested by a data user 172, other levels of accuracy scores may be needed, step 340. For example, the data accuracy scoring system may calculate, based on the individual accuracy scores for each of the fields in a record, the overall accuracy of that data record, such as by combining the accuracy scores for each of the fields, with field scores weighted if appropriate (e.g. more important data fields may be given more weight than less important data fields, with importance based, e.g., on the particular purpose for which the accuracy data is being requested).

As another example, data users may need (in addition to or in lieu of scores for individual data records) an overall accuracy score for a data source (e.g., calculated by combining individual accuracy scores of all records originating from that source). As yet another example, a data user may need an accuracy score pertaining to an entity. That is, it may be useful to have accuracy scores for all the data stored in the data storage system 132 for a specified entity or individual (i.e., combined scores for all individual records pertaining to the specified entity/individual), so that if data records from multiple data sources are retrieved pertaining to an entity/individual, the data user requesting that data can be made aware of the overall accuracy of those records. At step 350, the various levels of scoring are calculated and those various scores may be stored at the data storage system 132, step 352.

In some cases, an individual data score (e.g., a score for a data record, for data source, or for an entity) may be requested by a data user 172 and such score may be calculated using steps 310-330 of FIG. 3 and provided to the user. The specific manner in which data scores may be requested by a data user and provided in response to such a request will be described below in conjunction with FIG. 4.

In the remaining steps in FIG. 3, it is envisioned that scoring has been done, on an ongoing basis, for data received at the data management system 130 from the various data sources 120, 122 and 124, and that a data user that may desire monitoring of data accuracy scores and being alerted when a data accuracy score (e.g., for a specific data source or for an entity) changes over a period of time and to an extent for which the data user wants to be notified. Thus, at step 360 the data accuracy monitoring system 180 determines whether a data user has requested that the data accuracy scores be monitored. If no monitoring is required (e.g., the user has only requested an individual score without it being monitored), the data accuracy scoring system 160 simply reports the results of a previously calculated score, step 364, such as a calculated accuracy score developed at steps 310-352. If monitoring is requested or required at step 360, then the data accuracy monitoring system 180 waits a predetermined period of time, step 370, before recalculating a data score for which monitoring is desired. For example in some cases, a data user may want to monitor data scores on a weekly basis, and at the end of each reporting week at step 372, the score being monitored is recalculated at step 372. The recalculated score is compared to the previous score stored at the data storage system 132 (e.g., the previous score for a data source or for an entity), step 374, and if the new recalculated score meets a predetermined threshold at step 380, the data user requesting monitoring is alerted at step 390. As an example, say a data user wants to know whenever an accuracy score over a period of time drops more than 20%. That user is alerted at step 390 after such a drop is detected. If the threshold is not met at step 380, the process returns to step 370 for continued monitoring.

The monitoring as described in connection with steps 370-390 may be used in various contexts. For example a bank may want the accuracy of its own data (e.g., all internal data pertaining to its customers) monitored to make sure it is systems and business processes are accurately collecting data, and that data errors are not being introduced because of clerical errors by employees or because it does not have adequate processes in place to collect updated data as circumstances change (e.g., new customer addresses, phone numbers, email addresses, etc.). As another example, that same bank may want to be alerted if the accuracy of data for any customer changes significantly, resulting, e.g., from a customer not taking steps to update its own data or perhaps a customer or a third party purposely providing false data for improper or fraudulent purposes. Such a significant change in accuracy can be reported to the bank at step 390.

It should be appreciated that a significant change in accuracy scores may not be appropriately noticed when the predetermined period of time between monitoring (step 370) is relatively short. Thus a bank that may request monitoring on not only a weekly basis, but might also request monitoring, for example, on an annual basis, so that changes in accuracy that may not be perceptible week-to-week may be more noticeable and can be acted on when the comparison of scores at step 374 is over a longer period of time.

Figure 4:
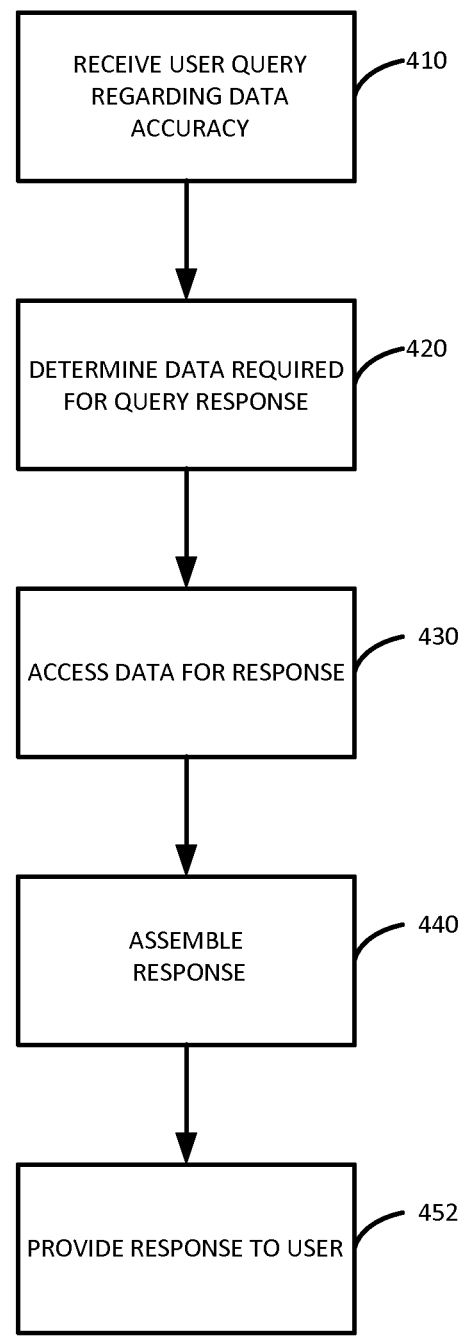
FIG. 4 is a flow diagram illustrating a process for querying a data accuracy system, such as the data accuracy system seen in FIG. 2.

Turning now to FIG. 4, there is illustrated a process by which one of the data users 172 may request in real time an accuracy score through the data accuracy query system 170. In this illustrated example, it is assumed that the data user has received or compiled the data record based on information that it is been given, such as a bank (the data user) that has been given personal information from a customer seeking to open an account. The data record consisting of the information received by the customer is included in a query that is received from a data user at the data accuracy query system 170, step 410. The data accuracy query system 170 determines stored data that will be required from the data management system 130 for purposes of responding to the query, step 420. For example, the query from the data user may include an entity identifier (such as a social security number in the case of an individual) and several data elements of personal information, such as a full name, address, and phone number. The data management system 130, at step 430, accesses data for the same entity (using entity resolution provided at entity resolution system 150) and provides the candidate record (received from the data user) and retrieved records from the data management system 130 pertaining to the same entity, to the data accuracy scoring system 160, where accuracy scores for each field or element of the candidate record are calculated (using steps 310-352 of FIG. 3). The calculated accuracy scores are assembled in a response prepared by the data accuracy query system 170, step 440, and the response is provided to the requesting data user at step 452. Although not illustrated in FIG. 4, the data record received from the data user (and its calculated accuracy score) may also then be stored at the data storage system 132 and used for subsequent scoring of other data records.

Figure 5:
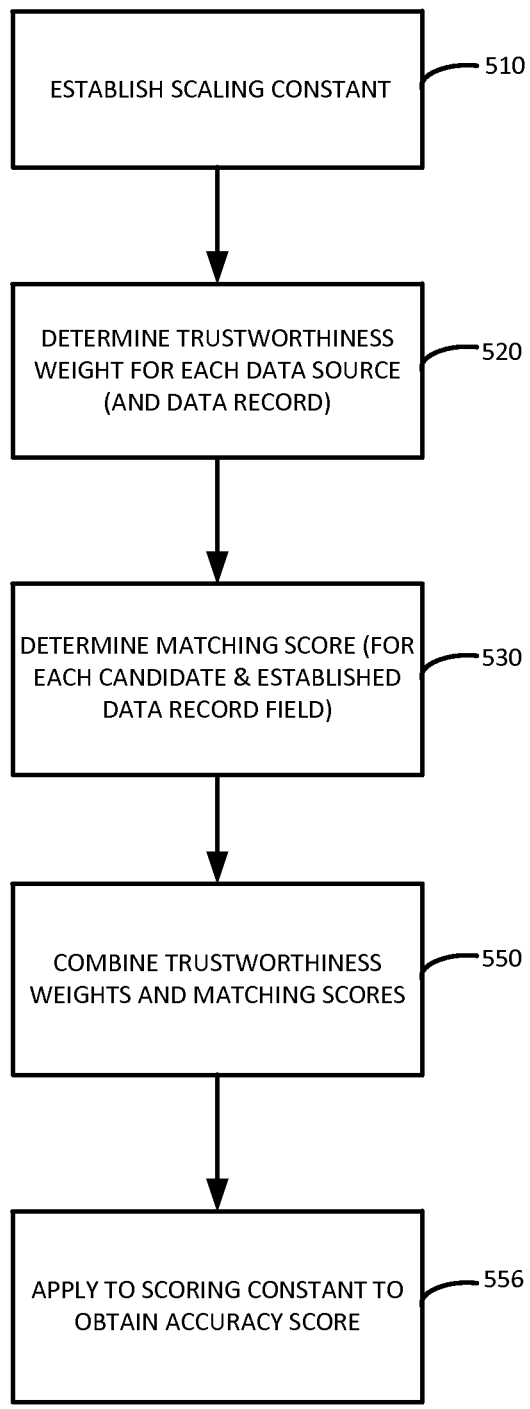
FIG. 5 is a flow diagram illustrating a process for calculating an accuracy score for a field within a data record.

Turning now to FIG. 5, there is illustrated a more detailed process for the calculation of an accuracy score for each field of the candidate record (step 324, FIG. 3). At step 510, a scaling constant is determined for use with the scoring. The scaling constant merely determines the range of accuracy scores. For example, and as will be described shortly, if an accuracy score is be calculated and assigned a value from 0 to 100, the scaling constant will be 100. Next, at step 520, the trustworthiness weight is determined for each record that is used for calculating the accuracy score. As mentioned earlier, the trustworthiness weight may be pre-established, by the entity operating data accuracy system 110, for each data source. Alternatively, a process may be implemented for calculating the trustworthiness of a data record based on its comparison to other data records, as will be described shortly in conjunction with FIG. 6. At step 530 a matching score is first calculated for each field of the candidate record and the corresponding field of each established record retrieved from the data management system 130. At step 550 the values of the trustworthiness weight and matching score (for corresponding fields of all the examined data records) are combined and then summed, and then, at step 556 the scaling factor is applied to the combined trustworthiness weights and matching scores.

The combination of trustworthiness weights and matching scores and the application of a scaling constant are, in the described embodiment, accomplished using the following equation to obtain a data accuracy score (DAS) for each field of a data record:

$$DAS = \frac{k}{1 + e^{-2\Sigma_{i=1}^{n} w_i \cdot (m_i - \frac{1}{2})}}$$

where:
  e is a constant (Euhler's number);
  k is the scaling constant, previously discussed (in the described embodiment, scores will be provided between 0 and 100, and thus k equals 100);
  w is the trustworthiness weight, previously discussed, that indicates the trust level of the source of each established data record (in the described embodiment, w is a value between 0.0 and 1.0);
  m is the normalized matching score for the field of the candidate record and the corresponding field of the data records being used for the calculation (in the described embodiment, m is a value between 0.0 and 1.0). The value is normalized by summing all the individual match values (i.e. how the field value matches against the field value in the other records) and dividing by the count adjusted for the uncertainty of not truly knowing the accuracy.

$$m_i = \frac{\Sigma_{j=1}^{n} M(v_i, v_j)}{n + \frac{1}{n}}$$

where M $(v_i, v_j)$ is a matching algorithm that takes in two field values $(v_i, v_j)$ and calculates a value between 0.0 (no match) and 1.0 (exact match)—see "equivalency factor" below for description of the uncertainty adjustment $$\left(n + \frac{1}{n}\right);$$

and
  i is a number from 1 to n, where n is the number of data records being used for the calculation.

Before providing examples of data accuracy scores calculated using the equation above, it should be noted that the matching score m (also referred to as a "matching framework score") can be obtained using known techniques. Briefly, the matching score is a calculated "distance" between two terms (i.e., two terms or values in corresponding fields of two different data records), where 0.0 represents no similarity between the two terms (the greatest distance) and 1.0 represents the terms being identical (the least possible distance). One method for obtaining a matching framework score between two terms is described in U.S. application Ser. No. 14/579,894, filed Dec. 22, 2014 by James R. Mortensen et al., entitled "IDENTITY CONFIDENCE SCORING SYSTEM AND METHOD," commonly owned with the present application and incorporated herein by reference for all purposes. Briefly, such method uses the so-called "Levenshtein" distance method and pre-established equivalents between words and common abbreviations (e.g., "Joseph" and "Jos.," "John" and "J.," etc.) to establish a numerical matching score between any two given terms or values.

Example

The following table illustrates the street address field of a candidate data record and the corresponding street address fields of four established data records (from four different data sources, Data Source 1-Data Source 4):

|  | Candidate Record | Data Source 1 | Data Source 2 | Data Source 3 | Data Source 4 |
|---|---|---|---|---|---|
| Data Values | 123 Elm St. | 123 Elm St. | 123 Elm Drive | 456 Oak St. | (empty) |
| Trustworthiness Weight | 0.5 (unknown) | 0.8 | 0.8 | 0.5 | 0.8 |
| Raw Matching Score: $M(v_i, v_j)$ | 1.0 (matches self) | 1.0 | 0.98 | 0.0 | N/A |
| Adjusted Matching Score: $m_i$ | (1.0 + 1.0 + 0.98 + 0.0)/ (4 + 1/4) = 2.98/4.25 = 0.701 | 0.701 | 0.696 | 0.235 | N/A |

In this example, the term or value in the candidate record for which an accuracy score is being calculated is "123 Elm St." Data Source 1 and Data Source 2 are both fairly well trusted sources (having been assigned a trustworthiness weight of 0.8) and both have the similar data ("123 Elm St." and "123 Elm Drive"), and thus a matching score of "1.0" and "0.98," respectively. Data Source 3 is not as well trusted (having been assigned a trustworthiness weight of 0.5), and has a different data value ("456 Oak St.") and a matching score of "0.0." Data Source 4 is fairly well trusted (having been assigned a trustworthiness weight of 0.8), but the data field is empty (and has thus is not included directly in the calculation of DAS—indirectly this uncertainty has been taken into account in the adjusted matching score via the uncertainty adjustment $$n + \frac{1}{n}.$$

Thus the accuracy score (DAS) for this field of the candidate record is calculated as follows:

$$DAS = \frac{100}{1 + e^{-2(.5 \cdot (0.701 - .5) + .8 \cdot (0.701 - .5) + .8 \cdot (0.696 - .5) + .5(0.235 - .5))}}$$

which calculates as $$DAS = \frac{100}{1 + e^{-2(0.101 + 0.161 + 0.157 - 0.132)}}$$

or $$DAS = \frac{100}{1 + e^{-0.573}}$$

or $$DAS = \frac{100}{1.564} \cong 64.$$

As mentioned in connection with FIG. 3 (step 330), the accuracy score (in this case the score of 64) is then stored in the data storage system 130 as the accuracy score for the street address field of the candidate record.

It should be appreciated that, in the above-described embodiment, the accuracy score for a candidate record is calculated using the trustworthiness weight and matching score for all the data records, including the candidate record (since the trustworthiness of the candidate record itself would normally have a bearing on the accuracy score for the candidate record). In alternative embodiments, the accuracy score for candidate record might be computed based on the trustworthiness weights and matching scores for the established retrieved data records only, especially in circumstances where the trustworthiness of the data source providing the candidate record is uncertain or suspect. Once there is more confidence in the trustworthiness of the data source providing the candidate record, the trustworthiness weight of the candidate record could thereafter be included in the calculation of accuracy scores for the candidate record.

Various methods may be employed to determine a trustworthiness weight for use in calculating the accuracy score. As mentioned earlier, a trustworthiness weight for each data source may be based on the judgment of the accuracy system operator, taking into account, for example, the subjective view of the operator as to the trustworthiness of any particular data source. Alternatively, a trustworthiness weight may be calculated by the data accuracy system 110 by evaluating representative data elements/fields of data records from each particular source.

Figure 6:
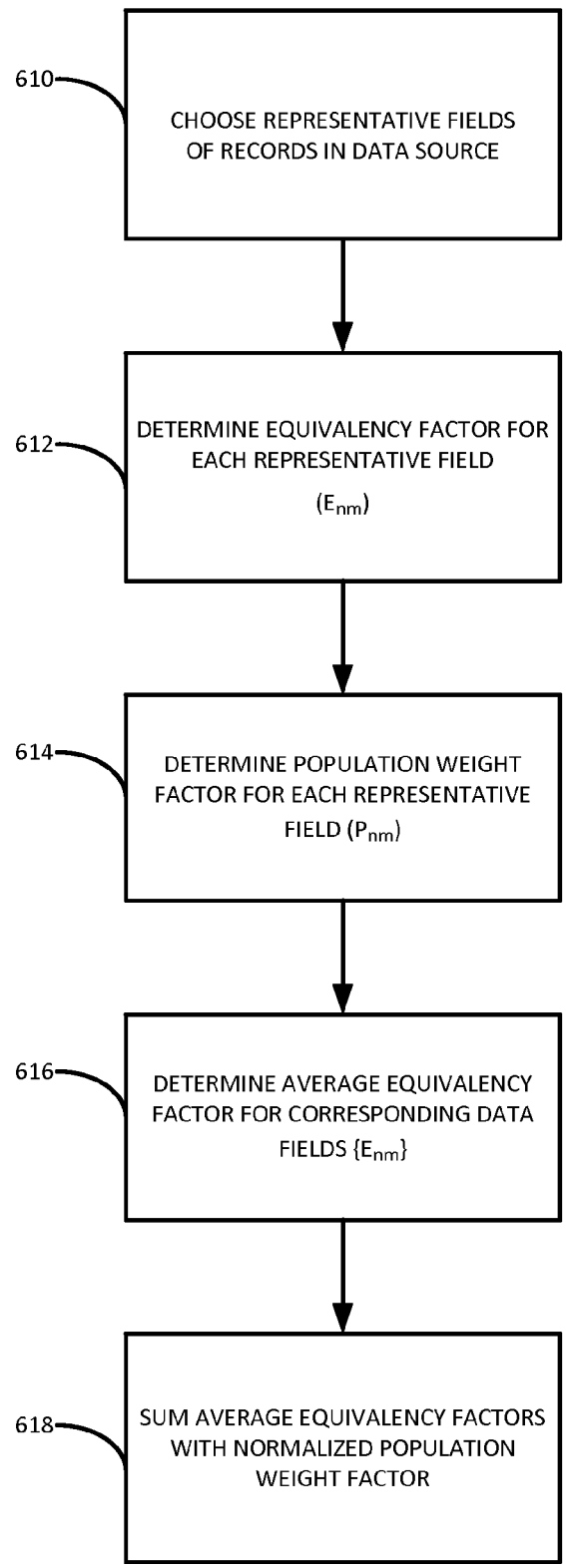
FIG. 6 is a flow diagram illustrating a process for calculating a trustworthiness weight, for use in calculating an accuracy score in the process of FIG. 5.

FIG. 6 illustrates one such alternative process for calculating a trustworthiness weight for a particular data source. At step 610, representative data fields for records within the data sources are chosen. Representative fields might be chosen based on the general importance of those fields relative to other data fields of the records. As an example, in many circumstances data fields with content related to name, address, phone and email are important, and such fields could be the chosen representative fields. At step 612 an equivalency factor is determined for each representative field, based on the equivalency or degree of match that exists in corresponding representative fields of records at that same data source. The equivalency factor $E_{nm}$, (for each representative field m of each data source n) can be calculated based on the following formula:

$$E_{nm} = \frac{V_{nm}}{V_n + \frac{1}{V_n}}$$

where $V_{nm}$ this is the number of records at the source n that have equivalent data values in the corresponding field, and $V_n$ is the total number of records at the source being evaluated. Equivalency can be established by the matching framework score discussed earlier. For example, it could be determined that any data field having a matching framework score of 0.8 or higher will be deemed equivalent. It should be appreciated that $E_{nm}$ (which has a value between 0.0 and 1.0) becomes larger as the number of corresponding fields having equivalent data increases. As an example, if there are three records being evaluated, and the corresponding fields in all three records have equivalent data, then the equivalency factor $E_{nm}$ is 0.9, i.e., $V_{nm}=3$, $V_n=3$, and thus $$E_{nm} = \frac{3}{3 + \frac{1}{3}} = 0.9.$$

As a further example, if there are three data records and only two have equivalent data, then the equivalency factor $E_{nm}$ is 0.6, i.e., $V_{nm}=2$, $V_n=3$, thus $$E_{nm} = \frac{2}{3 + \frac{1}{3}} = 0.6.$$

In some cases, it may be that only a single record has a representative data field populated with content (the representative data fields in the other data records are all empty). In such case, the equivalency is $$E_{nm} = \frac{1}{1 + \frac{1}{1}} = 0.5.$$

It should be appreciated that the value $$V_n + \frac{1}{V_n}$$

represents an uncertainty adjustment when used as described above for calculating an equivalency factor $E_{nm}$ (and when used as described earlier in conjunction with the normalized matching score m for calculating a data accuracy score DAS). The uncertainty adjustment is used as a denominator in the various calculations herein (for purposes of calculating a degree of "match" or "equivalency"), and thus increases the value of a calculation as more data sources ($V_n$) are involved and decreases the value of the calculation as fewer data sources ($V_n$) are involved. The uncertainty adjustment has its greatest value when there is only one source involved (and yields a maximum denominator value of "2" and thus decreases the value of the calculation in question in order to reflect greater uncertainty) and has its lowest value when the highest possible number of sources are involved (and yields a minimum denominator value approaching "1" and thus increases the value of the calculation in question in order to reflect less uncertainty).

At step 614, a population weight factor is established for each representative field. The population weight factor $P_{nm}$ can be calculated based on the following formula:

$$P_{nm} = \frac{F_{nm}}{R_n}$$

where $F_{nm}$ is the total count of representative fields in all of the records in the particular data source that are populated and $R_n$ is the total number of data records from the data source. As an example, if the total number of data records $R_n$ at a source is 100 and the number of records $F_{nm}$ that have the representative field populated with data is 90, then the population weight factor is 0.9. It will be appreciated that $P_{nm}$ provides a factor that takes into account that well populated data fields impact the trustworthiness weight more so than sparsely populated data fields.

At step 616, the average equivalency factor $\{E_{nm}\}$ for each of the corresponding data fields is determined and then at step 618 the trustworthiness weight w for a given source n is calculated, by summing the average equivalency factor (along with an adjusted normalized population weight factor) for each of the representative data fields, based on the following formula, $$w_n = \sum_1^m \frac{P_{nm}}{\sum P_n} \cdot \{E_{nm}\}$$

where $\{E_{nm}\}$ is the average equivalency factor for each corresponding data field and $$\frac{P_{nm}}{\sum P_n}$$

is the adjusted normalized population weight factor (population weight factor for the given field divided by the summed total population weights $P_n$ for all data sources). As an example, if the average equivalency factor $\{E_{nm}\}$ for three representative data fields is 0.7, 0.8 and 0.9, and the population weight factors are 0.51, 0.34, and 0.85 (adjusted normalized population weight factor is then 0.3, 0.2, and 0.5 for those same three representative data fields, respectively), then the trustworthiness weight w for that data source would be 0.82 (w=(0.3)(0.7)+(0.2)(0.8)+(0.5) (0.9)=0.82).

It should be appreciated that the foregoing is merely one embodiment for calculating a trustworthiness weight and that other formulas and implementations that could be used for establishing the trustworthiness weight.

Figure 7:
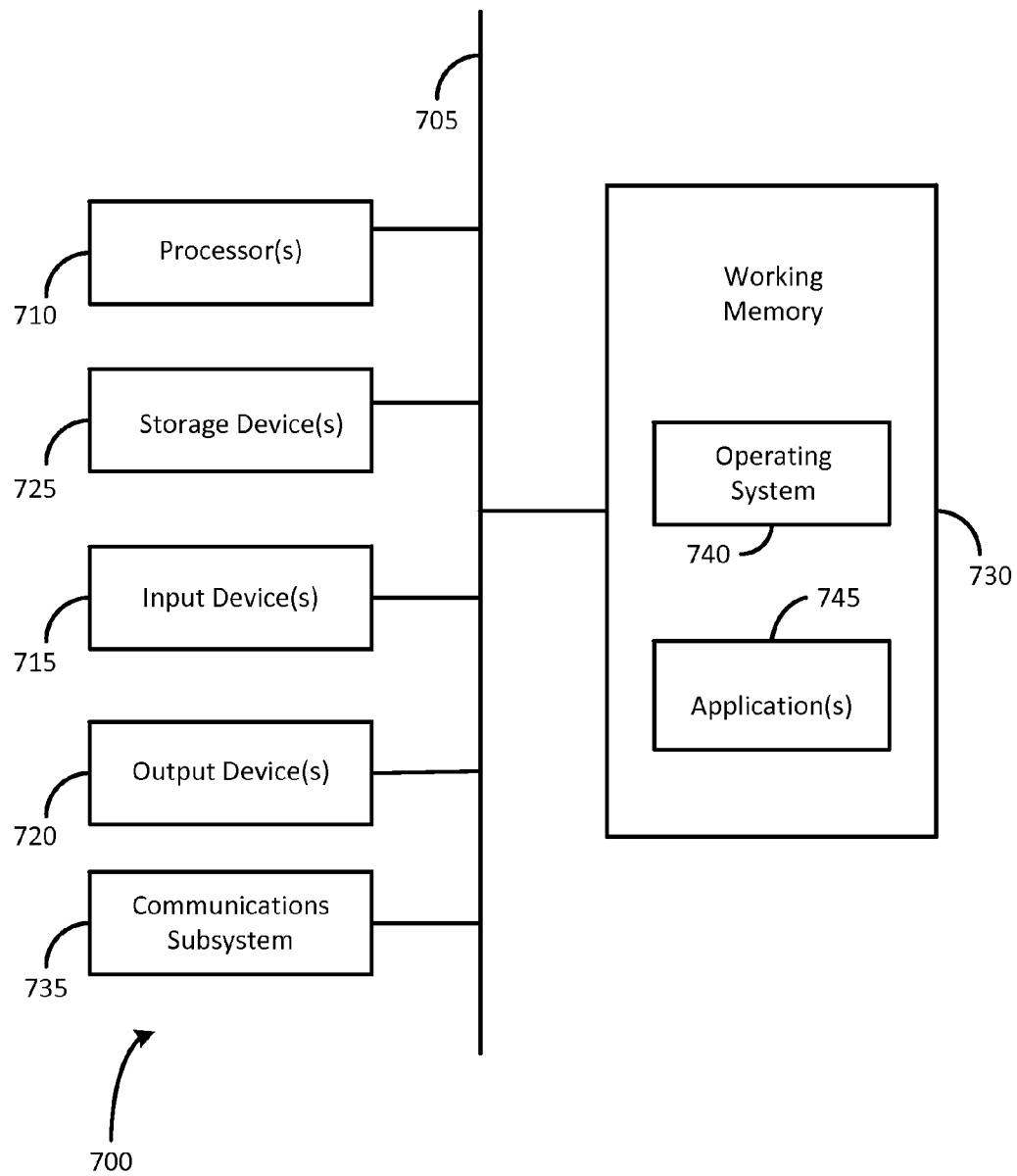
FIG. 7 is a block diagram illustrating an exemplary computer system that may be used to implement various systems seen in FIG. 2.

FIG. 7 is a block diagram illustrating an exemplary computer system upon which embodiments of the present invention may be implemented. This example illustrates a computer system 700 such as may be used, in whole, in part, or with various modifications, to provide the functions of the data accuracy system 110, the multi-source data management system 130 and the entity resolution system 150, as well as other components and functions of the invention described herein.

The computer system 700 is shown comprising hardware elements that can be electrically coupled or otherwise in communication via a bus 705. The hardware elements can include one or more processors 710, including, without limitation, one or more general-purpose processors and/or one or more special-purpose processors (such as digital signal processing chips, graphics acceleration chips, and/or the like); one or more input devices 715, which can include, without limitation, a mouse, a keyboard and/or the like; and one or more output devices 720, which can include, without limitation, a display device, a printer and/or the like.

The computer system 700 may further include one or more storage devices 725, which can comprise, without limitation, local and/or network accessible storage or memory systems having computer or machine readable media. Common forms of physical and/or tangible computer readable media include, as examples, a floppy disk, a flexible disk, hard disk, magnetic tape, or any other magnetic medium, an optical medium (such as CD-ROM), punchcards, papertape, any other physical medium with patterns of holes, a random access memory (RAM), a read only memory (ROM) which can be programmable or flash-updateable or the like, and any other memory chip, cartridge, or medium from which a computer can read data, instructions and/or code. In many embodiments, the computer system 700 will further comprise a working memory 730, which could include (but is not limited to) a RAM or ROM device, as described above.

The computer system 700 also may further include a communications subsystem 735, such as (without limitation) a modem, a network card (wireless or wired), an infra-red communication device, or a wireless communication device and/or chipset, such as a Bluetooth® device, an 802.11 device, a WiFi device, a WiMax device, a near field communications (NFC) device, cellular communication facilities, etc. The communications subsystem 735 may permit data to be exchanged with a network, and/or any other devices described herein. Transmission media used by communications subsystem 735 (and the bus 705) may include copper wire, coaxial cables and fiber optics. Hence, transmission media can also take the form of waves (including, without limitation radio, acoustic and/or light waves, such as those generated during radio-wave and infra-red data communications).

The computer system 700 can also comprise software elements, illustrated within the working memory 730, including an operating system 740 and/or other code, such as one or more application programs 745, which may be designed to implement, as an example, the processes seen in FIGS. 3-6.

As an example, one or more methods discussed earlier might be implemented as code and/or instructions executable by a computer (and/or a processor within a computer). In some cases, a set of these instructions and/or code might be stored on a computer readable storage medium that is part of the system 700, such as the storage device(s) 725. In other embodiments, the storage medium might be separate from a computer system (e.g., a removable medium, such as a compact disc, etc.), and/or provided in an installation package with the instructions/code stored thereon. These instructions might take the form of code which is executable by the computer system 700 and/or might take the form of source and/or installable code, which is compiled and/or installed on the computer system 700 (e.g., using any of a variety of generally available compilers, installation programs, compression/decompression utilities, etc.). The communications subsystem 735 (and/or components thereof) generally will receive the signals (and/or the data, instructions, etc., carried by the signals), and the bus 705 then might carry those signals to the working memory 730, from which the processor(s) 705 retrieves and executes the instructions. The instructions received by the working memory 730 may optionally be stored on storage device 725 either before or after execution by the processor(s) 710.

Thus, the computer system 700 may be uniquely and specially programmed by virtue of code or instructions used for carrying out the processes described above, including the processes illustrated in FIGS. 3-6.

As mentioned earlier, there are various applications and environments in which data accuracy scores assigned to data records from multiple different sources may be useful. The following are only a few examples of many possible applications.

Banking Data

As briefly mentioned earlier, a bank may use data accuracy scores to evaluate the integrity of its own data and data systems. Many kinds of financial information data is collected by a bank, such as bank account ownership information (as initially collected and as updated over time), incoming check returns, outgoing check returns, check deposit/payment inquiries, identity verifications, stop payments, ACH transactions, account abuse/fraud notice data, credit card account status data, credit card abuse data, credit card fraud data, and a bank may provide such data to the multi-source data management system 130 for scoring at the data accuracy scoring system 160. Accuracy scores at various levels provided useful information to the bank. For example, an overall accuracy score of all the data provided by the bank provides a useful indication of how accurately the banks data is being collected and maintained. If the overall accuracy score degrades over time, internal bank processes may need to be examined to make sure bank employees are following proper procedures in collecting and maintaining data. Such data may be analyzed at various levels within the bank, such as overall accuracy scores indicating a potential problem throughout the bank, versus branch accuracy scores indicating a potential problem at one or more specific bank branches. It should be appreciated, there are many other possible applications for use by a bank where accuracy scores at a data record level, at an entity level, and at an overall bank level can assist in improving internal bank operations.

Government Benefits

Data collected by a government agency for purposes of administering benefits programs could be provided to the data system 110 for scoring. For example, the accuracy score of data records pertaining to one beneficiary could be used to flag potential fraud, such as when the accuracy score for one beneficiary is considerably lower than the average score of other beneficiaries. Similarly, as described above in conjunction with banks, a government agency may monitor the overall accuracy of all of its data records, in order to determine if employees are following proper procedures for collecting and maintaining data.

Data Purchasers

Aggregated data is often sold to businesses that may use such data for marketing and other purposes. In some cases, data is collected by data aggregators, with the collected data originating from many different sources having varying degrees of trustworthiness. After the data is collected, it is sold in bulk (on a one time or periodic basis), with the aggregator charging a fee for the amount or type of data provided to a purchaser. A purchaser of the data could use accuracy scores to determine whether the quality of the data justifies its cost. As just one example, a purchaser could obtain accuracy scores as the data is periodically provided by an aggregator. If the overall accuracy of the data degrades over time, the purchaser could negotiate a lower price for future purchases of data from that aggregator.

System Breaches

The systems of large retailers, insurance companies and other entities often collect large amounts of data (such as customer personal data, retail transaction data, and data financial accounts used by customers for transactions). Significant loss of customer goodwill (as well as financial losses) may result from compromise of that data. Hackers and other entities seeking to compromise a system will often manipulate data maintained within the system to test the boundaries of the collected data and develop a method for embedding malware within the system. Systems maintaining large amounts of data can periodically have the accuracy of that data scored, and if the accuracy degrades, the operator of the system can take steps to make sure that changes in data accuracy are not due to fraudulent manipulation of the maintained data.

Identity Manipulation

Fraudsters and others who attempt to conduct fraudulent transactions will often manipulate an otherwise authentic identity or will create a synthetic identity (where certain pieces of information are valid, but other pieces of information useful for fraudulent purposes are created). Individuals and entities that may be vulnerable to identity manipulation (such as a bank or retailer) could provide data received from potential customers to the data accuracy system 110. For example, if the accuracy score being provided by a potential customer is relatively low, the circumstances surrounding the potential customer can be investigated to determine whether the provided data may be part of an attempt to conduct a fraudulent transaction.

Frequent Users of Data Records

Some entities and individuals regularly receive and use data records as part of conducting their normal business operations, and may want to only use data records that are considered accurate. As an example, a university or other institution may collect data as part of research for military, pharmaceutical, legal or other applications. In some cases, data may be collected from individual subjects. In order to maintain the integrity of the research, individual data records may be assessed for accuracy as they are received, with data records having high scores used as part of the research and with data records having a low scores discarded.

It should be appreciated that the foregoing examples of applications are only exemplary, and that there are many other applications and fields where there may be advantageous use of data accuracy assessment, in accordance with embodiments of the invention.

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the data accuracy scoring system 160, the data accuracy query system 170 and the data accuracy monitoring system 180 may each be implemented by a single system having one or more storage device and processing elements. As another example, the data accuracy scoring system 160, the data accuracy query system 170 and the data accuracy monitoring system 180 may each be implemented by plural systems, with their respective functions distributed across different systems either in one location or across a plurality of linked locations.

Moreover, while the various flows and processes described herein (e.g., those illustrated in FIGS. 3-6) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for evaluating the accuracy of a data record, comprising:
    storing, at a data storage system, a plurality of data records received from a plurality of different data sources, wherein the data records have varying degrees of trustworthiness, and wherein each of the stored data record are associated with an entity;
    receiving a data record based on a specified entity, to evaluate the received data record to be evaluated for accuracy;
    retrieving a group of data records from the stored plurality for data records, each retrieved data record associated with the specified entity, each retrieved data record having a data field corresponding to a data field of the received data record to be evaluated, and each retrieved data record associated with one of the data sources; and
    calculating, at a data accuracy system, an accuracy score for the data field of the received data record to be evaluated, comprising:
    determining a trustworthiness weight for at least each one of the retrieved group of data records based on the trustworthiness of the data source providing each one of the group of data records;
    determining a matching score for at least the corresponding data field in each of the retrieved group of data records, based on the degree of similarity between (1) data in the corresponding data field in each of the retrieved group of data records and (2) data in the data field of the received data record to be evaluated; and
    combining, for the corresponding data field in each one of the retrieved group of data records, (1) the trustworthiness weight for that one of the retrieved group of records with (2) the matching score for the corresponding data field in that one of retrieved group of data records; and
    summing together the combined trustworthiness weight and matching score for every corresponding data field.

2. The method of claim 1, further comprising:
    determining a trustworthiness weight for the received data record;
    determining a matching score for the data field of the received data record;
    combining the trustworthiness weight for the received data record and the matching score for the data field of the received data record; and
    summing, with the previously summed trustworthiness weight and matching score for every corresponding data field, the combined trustworthiness weight for the received data record and the matching score for the data field of the received data record.

3. The method of claim 2, wherein the matching score for the data field of the received data record is assigned a predetermined value.

4. The method of claim 3, wherein the assigned predetermined value is 1.

5. The method of claim 1, further comprising:
    storing, in the data storage system, the accuracy score in association with the corresponding data field of the received data record for which the accuracy score was calculated.

6. The method of claim 1, further comprising:
calculating an accuracy score for each of other data fields in the received data.

7. The method of claim 6, further comprising:
calculating an overall accuracy score for the received data record, by combining accuracy scores for individual data fields of the received data record.

8. The method of claim 7, further comprising:
calculating at accuracy score for an identified entity, by combining accuracy scores for a plurality of data records associated with the identified entity.

9. The method of claim 7, further comprising:
calculating an accuracy score for one of the plurality of data sources, by combining accuracy scores for a plurality of data records that are provided by that one of the plurality of data sources.

10. The method of claim 1, further comprising:
monitoring, at the data accuracy system, the accuracy score, including:
waiting a predetermined period of time after calculating the accuracy score,
re-calculating the accuracy score; and
comparing the re-calculated accuracy score to a previously calculated accuracy score.

11. The method of claim 1, wherein the received data record associated with the specified entity is provided with a query from a data user, and wherein the method further comprises:
providing the calculated accuracy score to the data user as a response to the query.

12. The method of claim 1, wherein the plurality of different data sources are selected from a group comprising:
Published Research;
News;
Wikipedia;
Social Media;
Financial Transactions;
Financial Account Ownership Data;
Government Benefits/Licensing Records;
Court Records;
Voter Registration; and
Aggregated Public Data.

13. The method of claim 1, wherein the received data record associated with the specified entity is received with other data records from a financial institution, wherein the calculated accuracy score is provided to the financial institution, and wherein the calculated accuracy score is used by the financial institution to assess the accuracy of data maintained at the financial institution or assess the accuracy of data received at the financial institution from customers.

14. A system for evaluating the accuracy of a data record, comprising;
a data storage system for storing a plurality of data records received from a plurality of different data sources, wherein the data records have varying degrees of trustworthiness, and wherein each of the stored data records are associated with an entity;
a data accuracy system including a processor and a memory, the memory storing instructions that are executable by the processor and configure the data accuracy system to:
receive a data record associated with a specified entity, to evaluate the received data record for accuracy;
retrieve a group of data records from the stored plurality for data records stored at the data storage system, each retrieved data record associated with the specified entity, each retrieved data record having a data field corresponding to a data field of the received data record and each retrieved data record associated with one of the data sources; and calculate an accuracy score for the data field of the received data record, comprising:
determine a trustworthiness weight for at least each one of the retrieved group of data records based on the trustworthiness of the data source providing each one of the group of data records;
determine a matching score for at least the corresponding data field in each of the retrieved group of data records, based on the degree of similarity between (1) data in the corresponding data field in each of the retrieved group of data records and (2) data in the data field of the received data record; and
combine, for the corresponding data field in each one of the retrieved group of data records, (1) the trustworthiness weight for that one of the retrieved group of records with (2) the matching score for the corresponding data field in that one of retrieved group of data records; and
sum together the combined trustworthiness weight and matching score for every corresponding data field.

15. The system of claim 14, wherein the instructions executable by the processor further configure the data accuracy system to:
determine a trustworthiness weight for the received data record;
determine a matching score for the data field of the received data record;
combine the trustworthiness weight for the data record to be evaluated and the matching score for the data field of the received data record; and
sum, with the previously summed trustworthiness weight and matching score for every corresponding data field, the combined trustworthiness weight for the received data record and the matching score for the data field of the received data record.

16. The system of claim 15, wherein the matching score for the data field of the received data record is assigned a predetermined value.

17. The system of claim 16, wherein the assigned predetermined value is 1.

18. The system of claim 14, wherein the instructions executable by the processor further configure the data accuracy system to:
store, in the data storage system, the accuracy score in association with the corresponding data field of the received data record for which the accuracy score was calculated.

19. The system of claim 14, wherein the instructions executable by the processor further configure the data accuracy system to:
calculate an accuracy score for each of other data fields in the received data record.

20. The system of claim 19, wherein the instructions executable by the processor further configure the data accuracy system to:
calculate an overall accuracy score for the received data record, by combining accuracy scores for individual data fields of the received data record.

21. The system of claim 19, wherein the instructions executable by the processor further configure the data accuracy system to:
calculate an accuracy score for an identified entity, by combining accuracy scores for a plurality of data records associated with the identified entity.

22. The system of claim 19, wherein the instructions executable by the processor further configure the data accuracy system to:
calculate an accuracy score for one of the plurality of data sources, by combining accuracy scores for a plurality of data records that are provided by that one of the plurality of data sources.

23. The system of claim 14, wherein the instructions executable by the processor further configure the data accuracy system to:
monitor, at the data accuracy system, the accuracy score, including:
waiting a predetermined period of time after calculating the accuracy score,
re-calculating the accuracy score; and
comparing the re-calculated accuracy score to a previously calculated accuracy score.

24. The system of claim 14, wherein the received data record associated with the specified entity is provided with a query from a data user, and wherein the instructions executable by the processor further configure the data accuracy system to:
provide the calculated accuracy score to the data user as a response to the query.

25. The system of claim 14, wherein the plurality of different data sources are selected from a group comprising:
Published Research;
News;
Wikipedia;
Social Media;
Financial Transactions;
Financial Account Ownership Data;
Government Benefits/Licensing Records;
Court Records;
Voter Registration; and
Aggregated Public Data.

26. The system of claim 14, wherein the received data record associated with the specified entity is received with other data records from a financial institution, wherein the calculated accuracy score is provided to the financial institution, and wherein the calculated accuracy score is used by the financial institution to assess the accuracy of data maintained at the financial institution or assess the accuracy of data received at the financial institution from customers.

* * * * *